(12) United States Patent
Mizokawa et al.

(10) Patent No.: US 8,034,856 B2
(45) Date of Patent: Oct. 11, 2011

(54) SYNTHETIC RESIN COMPOSITION AND AUTOMOTIVE INTERIOR/EXTERIOR MATERIAL

(75) Inventors: Shigeo Mizokawa, Saitama (JP); Yoshinori Negishi, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/739,724

(22) PCT Filed: Oct. 8, 2008

(86) PCT No.: PCT/JP2008/068289
§ 371 (c)(1),
(2), (4) Date: Apr. 23, 2010

(87) PCT Pub. No.: WO2009/054267
PCT Pub. Date: Apr. 30, 2009

(65) Prior Publication Data
US 2010/0249288 A1    Sep. 30, 2010

(30) Foreign Application Priority Data
Oct. 25, 2007    (JP) .................................. 2007-277139

(51) Int. Cl.
*C08K 5/3412*    (2006.01)
(52) U.S. Cl. .......................................... 524/99; 524/102
(58) Field of Classification Search .................... 524/99, 524/102
See application file for complete search history.

(56) References Cited

U.S. PATENT DOCUMENTS
2010/0022689 A1 *   1/2010   Yukino et al. .................... 524/99

FOREIGN PATENT DOCUMENTS

| EP | 0 953 596 A2 | * | 11/1999 |
|----|----|----|----|
| EP | 1 731 508 A1 | * | 12/2006 |
| EP | 1 731 508 A1 | | 12/2006 |
| EP | 1 889 871 A1 | | 2/2008 |
| JP | 41-565 | | 1/1966 |
| JP | 46-42618 | | 12/1971 |
| JP | 48-65180 | | 9/1973 |
| JP | 59-62651 A | | 4/1984 |
| JP | 1-113368 A | | 5/1989 |
| JP | 2-166138 A | | 6/1990 |
| JP | 11-106577 A | | 4/1999 |
| JP | 11-310667 A | | 11/1999 |
| JP | 2000-136271 A | | 5/2000 |
| JP | 2000-159945 A | | 6/2000 |
| JP | 2004-210987 | * | 7/2004 |
| JP | 2004-210987 A | | 7/2004 |
| JP | 2005-48077 A | | 2/2005 |
| JP | 2005-054105 | * | 3/2005 |
| JP | 2005-54105 A | | 3/2005 |
| JP | 2006-342257 | * | 12/2006 |
| JP | 2006-342257 A | | 12/2006 |
| JP | 2008-202005 A | | 9/2008 |
| WO | WO 2005/082852 A1 | | 9/2005 |
| WO | WO 2008/077830 A2 | | 7/2008 |

\* cited by examiner

*Primary Examiner* — Ling Choi
(74) *Attorney, Agent, or Firm* — Birch, Stewart, Kolasch & Birch, LLP

(57) ABSTRACT

The invention provides a synthetic resin composition having better weather resistance than ever, and an automotive interior/exterior material using the same.

The synthetic resin composition contains a hindered amine compound (A) having a partial structure represented by the following general formula (1):

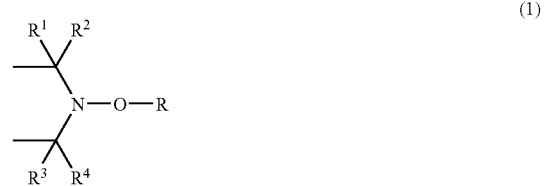

(1)

in an amount of 0.01 to 20 parts by mass with respect to 100 parts by mass of the synthetic resin; and a benzoate compound (B) represented by the following general formula (2):

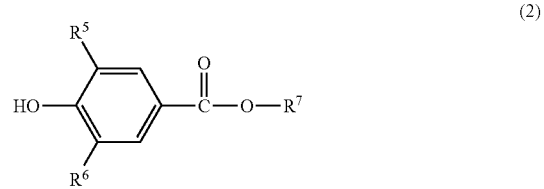

(2)

in an amount of 0.01 to 20 parts by mass with respect to the same, at a component mass ratio of (A)/(B) between 1/1 and 1/5.

In the synthetic resin composition according to the present invention, the component mass ratio of the hindered amine compound (A) to the benzoate compound (B), namely {(A)/(B)}, is preferably between 1/2 and 1/4.

10 Claims, No Drawings

SYNTHETIC RESIN COMPOSITION AND AUTOMOTIVE INTERIOR/EXTERIOR MATERIAL

TECHNICAL FIELD

The present invention relates to a synthetic resin composition and an automotive interior/exterior material, more particularly, to a synthetic resin composition, whose weather resistance is highly improved by combining a certain hindered amine compound and a certain benzoate compound, as well as an automotive interior/exterior material containing the synthetic resin composition.

BACKGROUND ART

Since a synthetic resin is degraded by light and not endurable for a long-term use, stabilization by adding a hindered amine compound or an ultraviolet absorber is prevailing.

Various hindered amine compounds, in addition to the exemplified compounds disclosed in the following Patent Documents 1 to 5, have been proposed.

Similarly, various ultraviolet absorbers, such as benzotriazole type ultraviolet absorbers, benzophenone type ultraviolet absorbers, and benzoate type ultraviolet absorbers, have been known. For example, Patent Document 6 has proposed phenyl benzoate and alkyl benzoate as benzoate type ultraviolet absorbers.

Furthermore, it has been broadly known that a highly stabilized resin composition can be obtained by a combined use of additives. For example, the following Patent Documents 7 to 11 have proposed a combined use of a certain hindered amine compound and a benzoate type ultraviolet absorber.

Patent Document 1: Japanese Examined Patent Application Publication No. 46-42618
Patent Document 2: Japanese Unexamined Patent Application Publication No. 48-65180
Patent Document 3: Japanese Unexamined Patent Application Publication No. 59-62651
Patent Document 4: Japanese Unexamined Patent Application Publication No. 1-113368
Patent Document 5: Japanese Unexamined Patent Application Publication No. 2-166138
Patent Document 6: Japanese Examined Patent Application Publication No. 41-565
Patent Document 7: Japanese Unexamined Patent Application Publication No. 11-310667
Patent Document 8: Japanese Unexamined Patent Application Publication No. 11-106577
Patent Document 9: Japanese Unexamined Patent Application Publication No. 2000-136271
Patent Document 10: Japanese Unexamined Patent Application Publication No. 2000-159945
Patent Document 11: Japanese Unexamined Patent Application Publication No. 2004-210987
Patent Document 11: Japanese Unexamined Patent Application Publication No. 2005-054105

DISCLOSURE OF THE INVENTION

Problems to be Solved by the Invention

However, requirements of the weather resistance for an automotive interior/exterior material and the like have become severer recently, and the use of a conventional hindered amine compound or ultraviolet absorber, or even a combination thereof has not become satisfactory enough.

Under such circumstances, an object of the present invention is to provide a synthetic resin composition having better weather resistance than ever, and an automotive interior/exterior material using the same.

Means for Solving the Problems

The present inventors have intensively studied to meet the object, and have finally found that a combination of a certain hindered amine compound and a certain benzoate type ultraviolet absorber can exhibit unprecedentedly excellent weather resistance, thereby completing the present invention.

That is, a synthetic resin composition according to the present invention comprises a hindered amine compound (A) having a partial structure represented by the following general formula (1):

(1)

(wherein $R^1$, $R^2$, $R^3$ and $R^4$ each independently represents a lower alkyl group having 1 to 4 carbon atoms, and R represents an alkyl group having 1 to 18 carbon atoms, the alkyl group being optionally substituted by a hydroxy group, or a cycloalkyl group having 5 to 8 carbon atoms) in an amount of 0.01 to 20 parts by mass with respect to 100 parts by mass of the synthetic resin composition;

and a benzoate compound (B) represented by the following general formula (2):

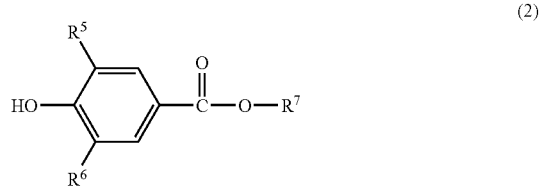

(2)

(wherein $R^5$ and $R^6$ each independently represents an alkyl group having 1 to 8 carbon atoms, and $R^7$ represents an alkyl group having 1 to 30 carbon atoms, an aryl group having 6 to 30 carbon atoms, an alkylaryl group having 7 to 30 carbon atoms, or an arylalkyl group having 7 to 30 carbon atoms) in an amount of 0.01 to 20 parts by mass with respect to the same, at a component mass ratio of (A)/(B) between 1/1 and 1/5.

In the synthetic resin composition according to the present invention, the component mass ratio of the hindered amine compound (A) to the benzoate compound (B), namely {(A)/(B)}, is preferably between 1/2 and 1/4. Further, as a preferable hindered amine compound is exemplified a compound represented by the following general formula (3):

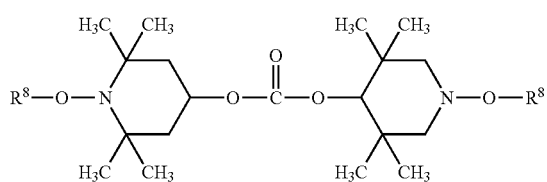

(3)

(wherein $R^8$ represents the same as the R above). Further, the $R^7$ in the general formula (2) is preferably an alkyl group having 1 to 30 carbon atoms. Furthermore, for the synthetic resin, polyolefin resins can be favorably exemplified, and a polyethylene resin, a polypropylene resin or an ethylene-propylene copolymer resin is preferable.

An automotive interior/exterior material according to the present invention comprises the afore-described synthetic resin composition.

Advantages of the Invention

The present invention can provide a synthetic resin composition having better weather resistance than ever, and an automotive interior/exterior material using the same.

BEST MODE FOR CARRYING OUT THE INVENTION

The present invention will be described in more details below.

Examples of a synthetic resin to be used according to the present invention include in the form of a thermoplastic resin: polyolefins or copolymers thereof, including α-olefin polymers, such as polypropylene, high density polyethylene, low density polyethylene, linear low density polyethylene, polybutene-1 and poly-4-methylpentene, ethylene-vinyl acetate copolymers and ethylene-propylene copolymers; halogen-containing resins, such as polyvinyl chloride, polyvinylidene chloride, chlorinated polyethylene, chlorinated polypropylene, polyvinylidene fluoride, chlorinated rubber, vinyl chloride-vinyl acetate copolymers, vinyl chloride-ethylene copolymers, vinyl chloride-vinylidene chloride copolymers, vinyl chloride-vinylidene chloride-vinyl acetate terpolymers, vinyl chloride-acrylic acid ester copolymers, vinyl chloride-maleic acid ester copolymers, and vinyl chloride-cyclohexyl maleimide copolymers; petroleum resins; coumarone resins; polystyrene; polyvinyl acetate; acrylic resins; copolymers of either or both of styrene and α-methylstyrene with other monomer(s), (e.g. maleic anhydride, phenylmaleimide, methyl methacrylate, butadiene, and acrylonitrile), such as AS resins, ABS resins, MBS resins, and heat resistant ABS resins; polymethyl methacrylate; polyvinyl alcohol; polyvinyl formal; polyvinyl butyral; linear polyesters, such as polyethylene terephthalate and polytetramethylene terephthalate; polyphenylene oxide; polyamides, such as polycaprolactam and polyhexamethylene adipamide; polycarbonate; branched polycarbonate; polyacetal; polyphenylene sulfide; polyurethane; and cellulosic resins; and mixtures thereof; as well as in the form of a thermosetting resin: phenol resins, urea resins, melamine resins, epoxy resins, and unsaturated polyester resins. Furthermore, elastomers, such as isoprene rubbers, butadiene rubbers, acrylonitrile-butadiene copolymer rubbers, and styrene-butadiene copolymer rubbers, may be used. Among the afore-listed synthetic resins, polyolefin resins, such as polyethylene, polypropylene, and ethylene-propylene copolymer resins, are preferable for the synthetic resin composition according to the present invention.

The synthetic resins can be used irrespective of the specific gravity, average molecular weight, melt viscosity, monomer composition, insoluble rate in a solvent, existence or nonexistence or type of stereoregularity, shape and size at the completion of the polymerization, type of a catalyst used for the polymerization, existence or nonexistence or method of a residual catalyst deactivation or removal treatment, existence or nonexistence, type, or concentration of a residual metal or acid component in the resin originated from a catalyst.

Examples of the alkyl group having 1 to 4 carbon atoms represented by $R^1$, $R^2$, $R^3$ and $R^4$ of the hindered amine compound (A) used for the present invention containing the partial structure represented by the general formula (1) include methyl, ethyl, propyl, isopropyl, n-butyl, sec-butyl and tert-butyl.

Examples of the alkyl group having 1 to 18 carbon atoms represented by R in the general formula (1) include methyl, ethyl, propyl, isopropyl, n-butyl, sec-butyl, tert-butyl, pentyl, hexyl, heptyl, octyl, 2-ethylhexyl, nonyl, isononyl, decyl, undecyl, dodecyl, tridecyl, tetradecyl, pentadecyl, hexadecyl, heptadecyl and octadecyl. Examples of an alkyl group substituted by a hydroxy group include groups that correspond to the above-exemplified alkyl groups but substituted by a hydroxy group, such as 2-hydroxyethyl, 2-hydroxypropyl, 3-hydroxypropyl and 2-hydroxy-2-methylpropyl.

Examples of the cycloalkyl group having 5 to 8 carbon atoms represented by R in the general formula (1) include cyclopentyl, cyclohexyl, cycloheptyl and cyclooctyl.

Specific examples of the hindered amine compound having a partial structure represented by the general formula (1) include the following Compounds No. 1 to 6, provided that the present invention should not be construed to be limited by the following compounds in any manner.

Compound No. 1

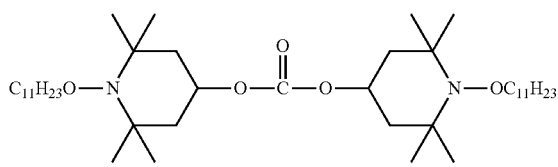

Compound No. 2

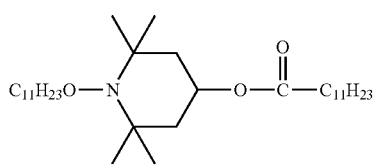

Compound No. 3

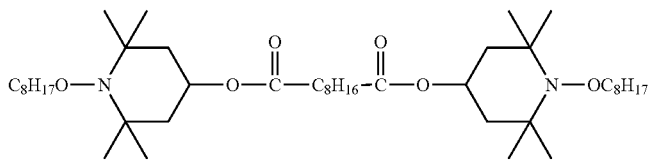

Compound No. 4

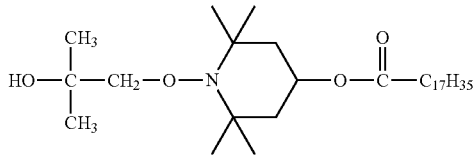

Compound No. 5

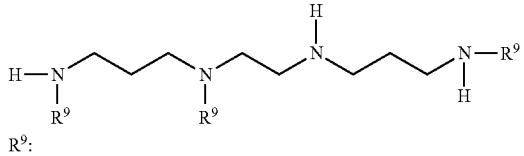

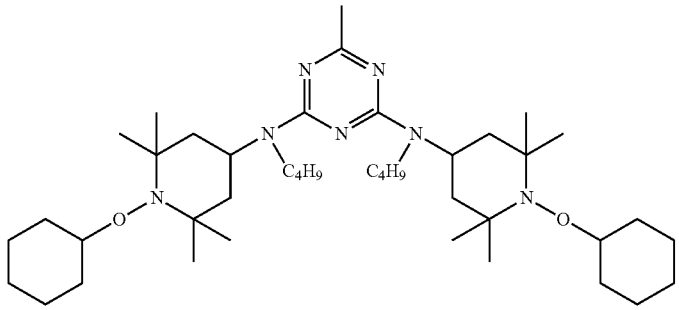

Compound No. 6

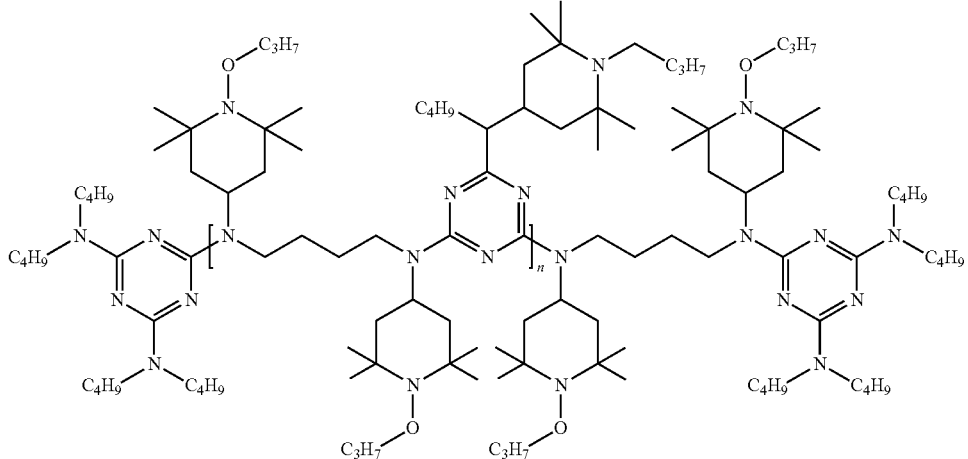

Among the above-described specific examples, the Compound No. 1 is preferable in view of especially high imparting activity of weather resistance.

The benzoate compound (B) used for the present invention is represented by the general formula (2), wherein $R^5$ and $R^6$ each independently represents an alkyl group having 1 to 8 carbon atoms, and $R^7$ represents an alkyl group having 1 to 30 carbon atoms, an aryl group having 6 to 30 carbon atoms, an alkylaryl group having 7 to 30 carbon atoms, or an arylalkyl group having 7 to 30 carbon atoms. Especially preferable is a compound whose $R^7$ is an alkyl group, because it is superior in the weather resistance improving activity for a curable resin composition according to the present invention.

Examples of the alkyl group having 1 to 8 carbon atoms represented by $R^5$ and $R^6$ in the general formula (2) include methyl, ethyl, propyl, isopropyl, butyl, sec-butyl, tert-butyl, pentyl, tert-pentyl, hexyl, heptyl, octyl and 1,1,3,3-tetramethylbutyl.

Examples of the alkyl group having 1 to 30 carbon atoms represented by $R^7$ in the general formula (2) include methyl, ethyl, propyl, butyl, pentyl, hexyl, heptyl, octyl, 2-ethylhexyl, nonyl, decyl, undecyl, dodecyl, tridecyl, tetradecyl, pentadecyl, hexadecyl, heptadecyl and octadecyl.

With respect to the $R^7$ in the general formula (2) for the aryl group phenyl, and for the alkylaryl group methylphenyl, butylphenyl, 2,4-di-tert-butylphenyl, 2,4-di-tert-amylphenyl, 2,4-dicumylphenyl, 2,4-di-tert-butyl-5-methylphenyl are exemplified. As the arylalkyl group is phenylmethyl exemplified.

Specific examples of the benzoate compound represented by the general formula (2) include the following Compounds No. 7 to 15, provided that the present invention should not be construed to be limited by the following compounds.

Compound No. 7
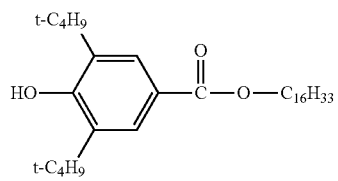

Compound No. 8
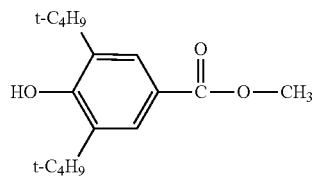

Compound No. 9
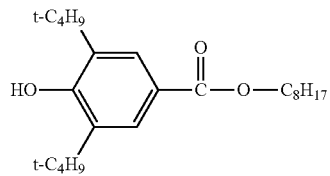

Compound No. 10
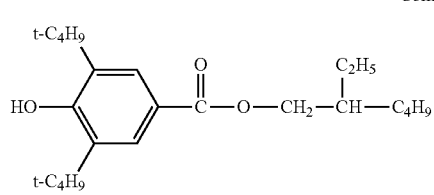

Compound No. 11
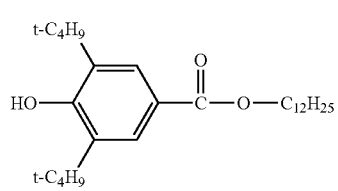

Compound No. 12
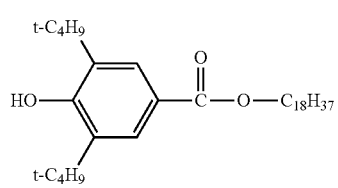

Compound No. 13
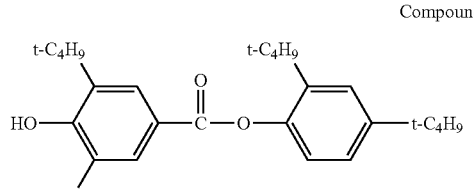

Compound No. 14
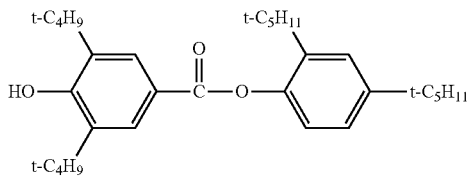

Compound No. 15
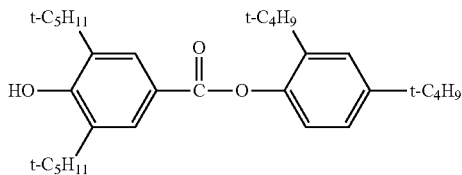

To the synthetic resin composition according to the present invention are added, with respect to 100 parts by mass of the synthetic resin, 0.01 to 20 parts by mass, preferably 0.05 to 10 parts by mass, and more preferably 0.1 to 5 parts by mass of a hindered amine compound (A); and 0.01 to 20 parts by mass, preferably 0.05 to 10 parts by mass, and more preferably 0.1 to 5 parts by mass of a benzoate compound (B); at a component mass ratio of (A)/(B) between 1/1 and 1/5, and preferably between 1/2 and 1/4. In case the hindered amine compound (A) is less than 0.01 part by mass, desirable stabilizing activity cannot be obtained, and reversely, in case it is beyond 20 parts by mass the appearance of the resin composition is deteriorated by blooming while stabilizing activity is not improved substantially. In case the benzoate compound (B) is less than 0.01 part by mass, there is no stabilizing activity, and in case it is beyond 20 parts by mass, the physical properties of the resin may be debased, or the appearance of the resin composition may be deteriorated by blooming.

The synthetic resin composition according to the present invention may contain in combination, as necessary, other additives, such as a phenolic antioxidant, a phosphorus-containing antioxidant, a sulfur-containing antioxidant, another ultraviolet absorber, another hindered amine compound, a nucleating agent, a fire retardant, a fire retardant aid, a processing aid, such as ethylenebis stearic acid amide and erucic acid amide, a pigment, a filler, a plasticizer, a metallic soap, hydrotalcites, and an antistatic agent.

Examples of the phenolic antioxidant include 2,6-di-tert-butyl-p-cresol, 2,6-diphenyl-4-octadecyloxyphenol, stearyl (3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzylthioacetate, thiodiethylene bis [(3,5-di-tert-butyl-4-hydroxyphenyl)propionate], 4,4'-thio-bis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris (3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyl-oxyethyl] isocyanurate, tetrakis[methylene-3-(3',5'-di-tert-butyl-4'-hydroxyphenyl)propionate]methane, 2-tert-butyl-4-methyl- 6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethylene glycol bis-[β-(3-tert-butyl-4-hydroxy-5-methylphenyl)propionate and tocopherol.

Examples of the phosphorus-containing antioxidant include triphenyl phosphite, tris(2,4-di-tert-butylphenyl) phosphite, tris(2,5-di-tert-butylphenyl)phosphite, tris(nonylphenyl)phosphite, tris(dinonylphenyl)phosphite, tris(mono- and di-nonylphenyl)phosphite, diphenyl acid phosphite, 2,2'-methylene bis(4,6-di-tert-butylphenyl)octyl phosphite, diphenyl decyl phosphite, diphenyl octyl phosphite, di(nonylphenyl)pentaerythritol diphosphite, phenyldiisodecyl phosphite, tributyl phosphite, tris(2-ethylhexyl) phosphite, tridecylphosphite, trilaurylphosphite, dibutyl acid phosphite, dilauryl acid phosphite, trilauryl trithiophosphite, bis(neopentyl glycol)-1,4-cyclohexane dimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra(C12-C15 mixed alkyl)-4,4'-isopropylidene diphenyl phosphite, bis[2,2'-methylenebis(4,6-diamylphenyl)]-isopropylidene diphenyl phosphite, tetra(tridecyl)-4,4'-butylidenebis(2-tert-butyl-5-methylphenol) diphosphite, hexa(tridecyl)-1,1,3-tris(2-methyl-5-tert-butyl-4-hydroxyphenyl)butane triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepin-6-yl)oxy]ethyl)amine, 2-(1,1-dimethylethyl)-6-methyl-4-[3-[[2,4,8,10-tetrakis(1,1-dimethylethyl) dibenzo[d,f][1,3,2]dioxaphosphepin-6-yl]oxy]propyl] phenol, 9,10-dihydro-9-oxa-10-phosphaphenanthrene-10-oxide, and 2-butyl-2-ethylpropanediol-2,4,6-tri-tert-butylphenol monophosphite.

Examples of the sulfur-containing antioxidant include dialkyl thiodipropionates, such as dilauryl, dimyristyl, myristyl stearyl, and distearyl esters of thiodipropionic acid; and β-alkylmercaptopropionic acids esters of polyols, such as pentaerythritol tetra(β-dodecyl mercaptopropionate).

Examples of another ultraviolet absorber include 2-hydroxy benzophenones, such as 2,4-dihydroxy benzophenone, 2-hydroxy-4-methoxy benzophenone, 2-hydroxy-4-octoxy benzophenone, and 5,5'-methylene bis(2-hydroxy-4-methoxy benzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene bis(4-tert-octyl-6-benzotriazolylphenol), a polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzo-triazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, and 2-[2-hydroxy-4-(3-methacryloyloxypropyl)phenyl]benzotriazole; 2-(2-hydroxyphenyl)-4,6-diaryl-1,3,5-triazines, such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12-C13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine, and 2,4,6-tris(2-hydroxy-3-methyl-4-hexyloxyphenyl)-1,3,5-triazine;

benzoates, such as phenyl salicylate, resorcinol monobenzoate, and 2,4-di-tert-butylphenyl-3,5-di-tert-butyl-4-hydroxybenzoate; substituted oxanilides, such as 2-ethyl-2'-ethoxyoxanilide, and 2-ethoxy-4'-dodecyloxanilide; cyanoacrylates, such as ethyl-α-cyano-β,β-diphenyl acrylate, and methyl-2-cyano-3-methyl-3-(p-methoxyphenyl) acrylate;

and various metal salts or metal chelates, especially nickel or chromium salts or chelates.

Examples of another hindered amine compound include 2,2,6,6-tetramethyl-4-piperidyl stearate, 1,2,2,6,6-pentamethyl-4-piperidyl stearate, 2,2,6,6-tetramethyl-4-piperidyl ethyl-4-piperidyl benzoate, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)butanetetracarboxylate, tetrakis(1,2,2,6,6-pentamethyl-4-piperidyl butanetetracarboxylate, bis(2,2,6,6-tetramethyl-4-piperidyl)di(tridecyl)-1,2,3,4-butanetetracarboxylate, bis(1,2,2,6,6-pentamethyl-4-piperidyl)di(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, a 1-(2-hydroxyethyl)-2,2,6,6-tetramethyl-4-piperidinol/diethyl succinate polycondensate, a 1,6-bis (2,2,6,6-tetramethyl-4-piperidylamino)hexane/dibromoethane polycondensate, a 1,6-bis(2,2,6,6-tetramethyl-4-piperidylamino)hexane/2,4-dichloro-6-morpholino-s-triazine polycondensate, a 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis (N-butyl-N-(1,2,2,6,6-pentamethyl-4-piperidyl) amino)-s-triazin-6-yl]-1,5,8,12-tetraazadodecane, 1,6,11-tris[2,4-bis (N-butyl-N-(2,2,6,6-tetramethyl-4-piperidyl) amino)-s-triazin-6-ylaminoundecane and 1,6-(1,2,2,6,6-pentamethyl-4-piperidyl)amino)-s-triazine-6-ylaminoundecane.

Examples of the nucleating agent include metal salts of an aromatic carboxylic acid, such as aluminum p-tert-butyl benzoate, and sodium benzoate; metal salts of an acidic phosphate ester, such as sodium bis(2,4-di-tert-butylphenyl)phosphate, lithium bis(2,4-di-tert-butylphenyl)phosphate, and sodium 2,2'-methylene-bis(4,6-di-tert-butylphenyl)phosphate; and polyhydric alcohol derivatives, such as dibenzylidene sorbitol, and bis(methylbenzylidene)sorbitol.

Examples of the fire retardant include halogen type fire retardants, such as tetrabromobisphenol A and decabromodiphenyl ether; phosphorus type fire retardants based on inorganic phosphorus compounds, such as red phosphorus and melamine phosphate, and phosphate compounds, such as triphenyl phosphate, a phenol/resorcinol/phosphoric acid condensate, and a bisphenol A/2,6-xylenol/phosphoric acid condensate; inorganic fire retardants, such as magnesium hydroxide, and aluminum hydroxide; and nitrogen-containing compounds, such as melamine cyanurate. The fire retardant should preferably be used in combination with a fire retardant aid, such as antimony oxide, or a drip-preventing agent, such as a fluorine-contained resin, and a silicone resin.

The pigment may be organic as well as inorganic, and examples thereof include white pigments, such as titanium oxide, and zinc sulfide; black pigments, such as carbon black; green pigments, such as chromium oxide, chrome green, zinc green, chlorinated copper phthalocyanine green, phthalocyanine green, naphthol green, and malachite green lake; blue pigments, such as ultramarine, iron blue, copper phthalocyanine blue, cobalt blue, phthalocyanine blue, fast sky blue, and indanthrene blue; red pigments, such as red lead, red iron oxide, basic zinc chromate, chrome vermilion, cadmium red, rose red, brilliant carmine, brilliant scarlet, quinacridone red, lithol red, vermilion, thioindigo red, and mingamiya red; and yellow pigments, such as chrome yellow, zinc yellow, yellow iron oxide, titan yellow, fast yellow, hansa yellow, auramine lake, benzidine yellow, and indanthrene yellow.

As the fillers are used glass fibers, talc, silica, calcium carbonate, etc. The surfaces of the fillers are preferably treated by a titanium-based or silane-based surface treatment agent to improve compatibility with resin.

As the metallic soap, are used salts between a metal, such as magnesium, calcium, aluminum, and zinc, and a saturated or unsaturated fatty acid, such as lauric acid, myristic acid, palmitic acid, stearic acid, behenic acid, and oleic acid. The soap can be used irrespective of the water content, melting point, particle size, composition of the fatty acids, selection of the production process between a metathetical process by a reaction of an alkali metal salt of a fatty acid with a metal oxide or hydroxide, and a direct process by a neutralization reaction of a fatty acid with a metal oxide or hydroxide in the presence or absence of a solvent, or whether either of the fatty acid or the metal is in excess.

As the hydrotalcites, both natural products and synthetic products can be used, and products modified by an alkali metal such as lithium can be also used. Especially, the product having a composition represented by the following general formula (4) is preferable:

$$Zn_xMg_yAl_2(OH)_2(x+y+2)CO_3 \cdot nH_2O \quad (4)$$

(wherein x is 0 to 3, y is 1 to 6, x+y is 4 to 6, and n is 0 to 10). The product can be used irrespective of the existence or nonexistence of crystal water or surface treatment. Although there is no particular restriction on the particle size, smaller size is preferable insofar as the properties of the hydrotalcite should not be lost. If the particle size is large, dispersibility becomes inadequate to decrease stabilizing activity, and the physical properties of a resulted product resin composition, such as mechanical strengths and transparency, will be compromised.

For the respective ingredients, the contents and qualities thereof are selected appropriately in accordance with the resin types, process conditions and end uses. Addition of the ingredients into a resin may be carried out according to a conventional process, such as a process in which each ingredient is mixed independently into the resin by, for example, a Henschel mixer and supplied to a processing machine; a process in which ingredients other than the resin are mixed preliminarily in a given combination, formed into powder or granule and added to the resin; a process in which master pellets containing high concentration ingredients in a resin are added to the resin; and a process in which ingredients are fed to the resin through a feeding port different from the port for the resin using an extruder having a plurality of feeding ports.

There is no particular restriction on a processing process for the synthetic resin composition according to the present invention, and an appropriate conventional process is selected depending on a resin to be used, existence of fillers, etc. More particularly, the synthetic resin composition according to the present invention can be molded by a conventional process, such as extrusion molding, injection molding, compression molding, and laminate molding.

With the synthetic resin composition according to the present invention, haze should not appear in a weather resistance evaluation described below, and the gloss should be not less than 30, preferably not less than 35. Decrease of the gloss means generation of cracks on the surface, which further means deterioration of the mechanical strengths as well as the appearance.

Although there is no particular restriction on the use of the synthetic resin composition according to the present invention, it can be used for general interior/exterior materials, preferably for interior/exterior materials of transport vehicle, and further preferably for the use exposed to outdoor radiation, such as automotive interior/exterior materials to be subjected to severe environments. Examples of automotive interior/exterior materials include exterior materials for a bumper, a spoiler, a side visor, a cowl vent grille, a radiator grille, a side molding and a rear panel garnish, and interior materials for an instrument panel, a ceiling, a door, a seat and a luggage room.

EXAMPLES

The present invention will be described in more detail by way of examples thereof.

Examples 1-1 to 1-5 and Comparative Examples 1-1 to 1-2

85 parts by mass of an ethylene-propylene copolymer resin (MFR=30, density=0.90 g/cm$^3$, flexural modulus=1,700 MPa), 15 parts by mass of talc, 3 parts by mass of a gray pigment, 0.1 part by mass of tetrakis[3-(3,5-di-tert-butyl-4-hydroxyphenylpropionyl)oxymethyl]methane, 0.1 part by mass of tris(2,4-di-tert-butylphenyl)phosphite, 0.1 part by mass of calcium stearate, and light stabilizers as set forth in the following Table 1 (a hindered amine compound and an ultraviolet absorber, the Composition being expressed in Table 1 in the unit of part by mass) were extruded at 230° C. to pellets. The yielded pellets were injection-molded at 230° C. to 2 mm-thick test pieces.

The weather resistance of a test piece was evaluated by means of the time to cracking (hr), the residual rate of gloss (%) and the color difference (ΔE) by a xenon irradiation test (conditions: UV irradiation intensity 0.55 W/m$^2$, wavelength 340 nm, black panel temperature 89° C., and with a quartz filter).

The gloss (unitless) was measured by Gloss Meter, Model TC-108D (by Tokyo Denshoku CO., LTD.). The obtained results are shown in the following Table 1.

TABLE 1

|  |  | Example | | | | | Comparative Example | |
|---|---|---|---|---|---|---|---|---|
|  |  | 1-1 | 1-2 | 1-3 | 1-4 | 1-5 | 1-1 | 1-2 |
| Composition | Compound No. 1[*1] | 0.100 | 0.067 | 0.050 | 0.040 | 0.033 | 0.133 | 0.018 |
|  | Compound No. 7[*2] | 0.100 | 0.133 | 0.150 | 0.160 | 0.167 | 0.067 | 0.182 |
| Evaluation of weather resistance | Time to cracking (hr) | 1680 | 2160 | 2400 | 2280 | 1800 | 1320 | 1560 |
|  | Residual rate of gloss (%) 480 hr | 86 | 86 | 86 | 88 | 92 | 88 | 94 |
|  | 840 hr | 84 | 85 | 85 | 88 | 93 | 87 | 87 |
|  | 1320 hr | 85 | 84 | 84 | 87 | 93 | 33 | 86 |
|  | 1560 hr | 64 | 80 | 85 | 85 | 84 | — | 40 |
|  | Color difference ($\Delta E$) 480 hr | 0.19 | 0.20 | 0.21 | 0.22 | 0.25 | 0.17 | 0.24 |
|  | 840 hr | 0.84 | 0.80 | 0.76 | 0.68 | 0.64 | 0.80 | 0.84 |
|  | 1200 hr | 1.50 | 1.65 | 1.63 | 1.67 | 1.76 | 1.85 | 1.63 |

[*1] Compound No. 1:

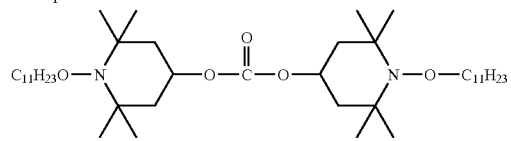

[*2] Compound No. 7:

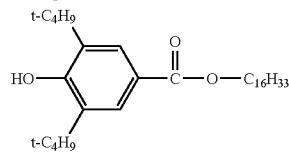

Example 2-1

The preparation of test pieces and the evaluation of weather resistance were conducted according to similar methods as in the above Examples, except that the benzoate component (B) was replaced by the Compound No. 13 according to the composition set forth in the following Table 2. The results are shown jointly in Table 2.

Comparative Examples 2-1 to 2-6

The preparation of test pieces and each evaluation were conducted under similar conditions as in the above Examples, except that hindered amine compounds and benzoate compounds were added according to the composition set forth in Table 2. The obtained results are shown jointly in Table 2.

TABLE 2

|  |  |  | Example | Comparative Example | | | | | |
|---|---|---|---|---|---|---|---|---|---|
|  |  |  | 2-1 | 2-1 | 2-2 | 2-3 | 2-4 | 2-5 | 2-6 |
| Composition | Compound No. 1 |  | 0.050 | — | — | 0.050 | 0.200 | — | — |
|  | Compound No. 13[*3] |  | 0.150 | 0.150 | 0.150 | — | — | 0.200 | — |
|  | Comparative compound 1[*4] |  | — | 0.050 | — | — | — | — | 0.100 |
|  | Comparative compound 2[*5] |  | — | — | 0.050 | — | — | — | 0.100 |
|  | Comparative compound 3[*6] |  | — | — | — | 0.150 | — | — | — |
| Evaluation of weather resistance | Time to cracking (hr) |  | 1680 | 1320 | 1440 | 1080 | 1560 | 840 | 1320 |
|  | Residual rate of gloss (%) | 480 hr | 86 | 87 | 88 | 81 | 91 | 83 | 80 |
|  |  | 840 hr | 84 | 86 | 87 | 71 | 83 | 70 | 63 |
|  |  | 1320 hr | 81 | 56 | 72 | — | 39 | 41 | — |
|  |  | 1560 hr | 66 | — | — | — | — | — | — |
|  | Color difference ($\Delta E$) | 480 hr | 0.19 | 0.22 | 0.18 | 0.25 | 0.18 | 0.25 | 0.14 |
|  |  | 840 hr | 0.83 | 0.81 | 0.80 | 1.83 | 1.81 | 2.10 | 1.79 |
|  |  | 1200 hr | 1.73 | 2.01 | 1.91 | — | 3.14 | — | 2.30 |

[*3] Compound No. 13:

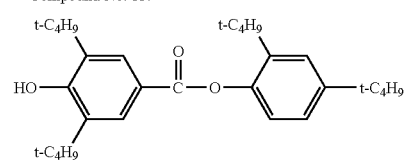

[*4] Comparative compound 1:

TABLE 2-continued

| | Example | Comparative Example | | | | | |
|---|---|---|---|---|---|---|---|
| | 2-1 | 2-1 | 2-2 | 2-3 | 2-4 | 2-5 | 2-6 |

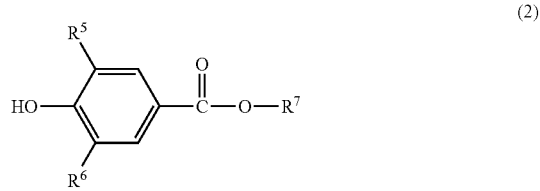

*5 Comparative compound 2:

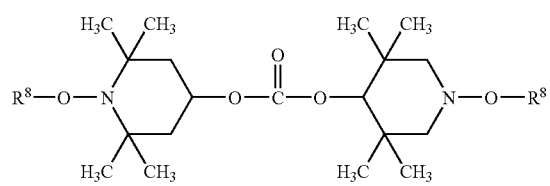

*6 Comparative compound 3:

It is obvious from the results shown in Table 1, that the weather resistance, especially the time to cracking, is excellent, in case a specific hindered amine compound and a specific benzoate compound are used at a specific ratio defined according to the present invention, indicating a noticeable effect thereof. It is further clear from the results shown in Table 2, that such noticeable effect can be attained only by a combination of a specific hindered amine compound and a specific benzoate compound according to the present invention.

Consequently, the present invention can provide a synthetic resin composition having excellent weather resistance and automotive interior/exterior materials using the same.

The invention claimed is:

1. A synthetic resin composition comprising
a hindered amine compound (A) having the following general formula (3):

$$(3)$$

wherein $R^8$ represents an alkyl group having 1 to 18 carbon atoms, the alkyl group being optionally substituted by a hydroxy group, or a cycloalkyl group having 5 to 8 carbon atoms, in an amount of 0.01 to 20 parts by mass with respect to 100 parts by mass of the synthetic resin; and a benzoate compound (B) represented by the following general formula (2):

$$(2)$$

wherein $R^5$ and $R^6$ each independently represents an alkyl group having 1 to 8 carbon atoms, and $R^7$ represents an alkyl group having 1 to 30 carbon atoms, an aryl group having 6 to 30 carbon atoms, an alkyl-, dialkyl- or trialkyl-aryl group having 7 to 30 carbon atoms, or an arylalkyl group having 7 to 30 carbon atoms, in an amount of 0.01 to 20 parts by mass with respect to the same, at a component mass ratio of (A)/(B) from 1/2 to 1/4.

2. The synthetic resin composition according to claim 1, wherein the $R^7$ in the general formula (2) is an alkyl group having 1 to 30 carbon atoms.

3. The synthetic resin composition according to claim 1, wherein the synthetic resin is a polyolefin resin.

4. The synthetic resin composition according to claim 2, wherein the synthetic resin is a polyolefin resin.

5. The synthetic resin composition according to claim 3, wherein the polyolefin resin is a polyethylene resin, a polypropylene resin, or an ethylene-propylene copolymer resin.

6. The synthetic resin composition according to claim 4, wherein the polyolefin resin is a polyethylene resin, a polypropylene resin, or an ethylene-propylene copolymer resin.

7. An automotive interior/exterior material comprising the synthetic resin composition according to claim 1.

8. An automotive interior/exterior material comprising the synthetic resin composition according to claim 2.

9. An automotive interior/exterior material comprising the synthetic resin composition according to claim 3.

10. An automotive interior/exterior material comprising the synthetic resin composition according to claim 5.

* * * * *